June 19, 1962 — C. B. CAPERTON — 3,039,715
ROD REEL DEVICE
Filed April 25, 1960 — 5 Sheets-Sheet 1

INVENTOR.
Charles B. Caperton,
BY Paul & Paul
ATTORNEYS.

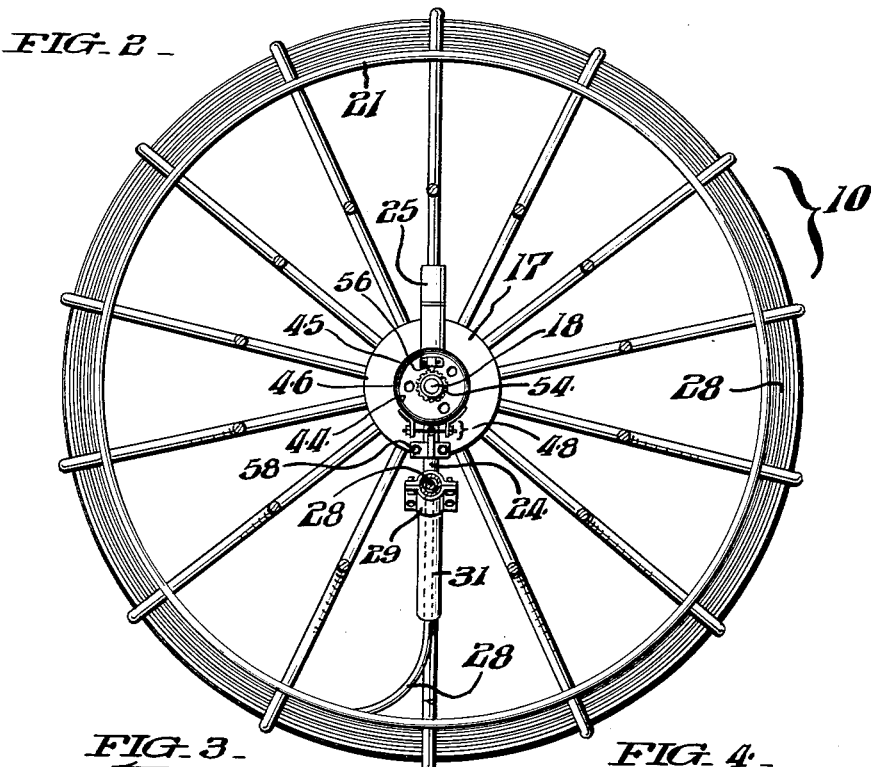
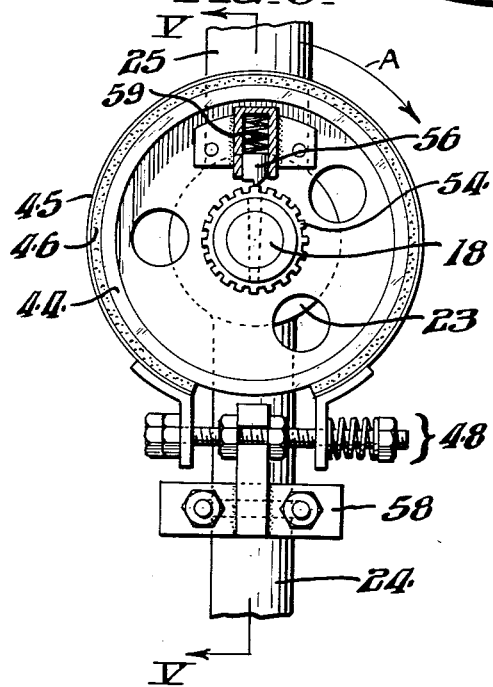
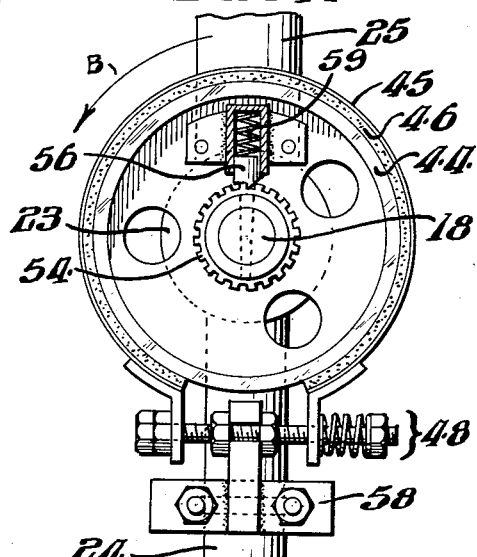

June 19, 1962  C. B. CAPERTON  3,039,715
ROD REEL DEVICE
Filed April 25, 1960  5 Sheets-Sheet 3
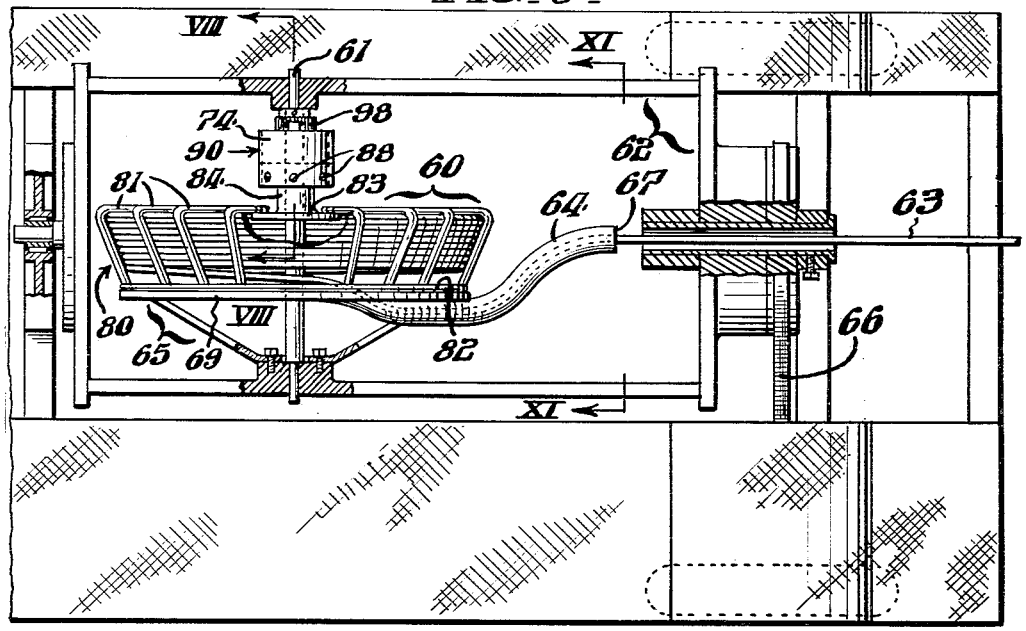
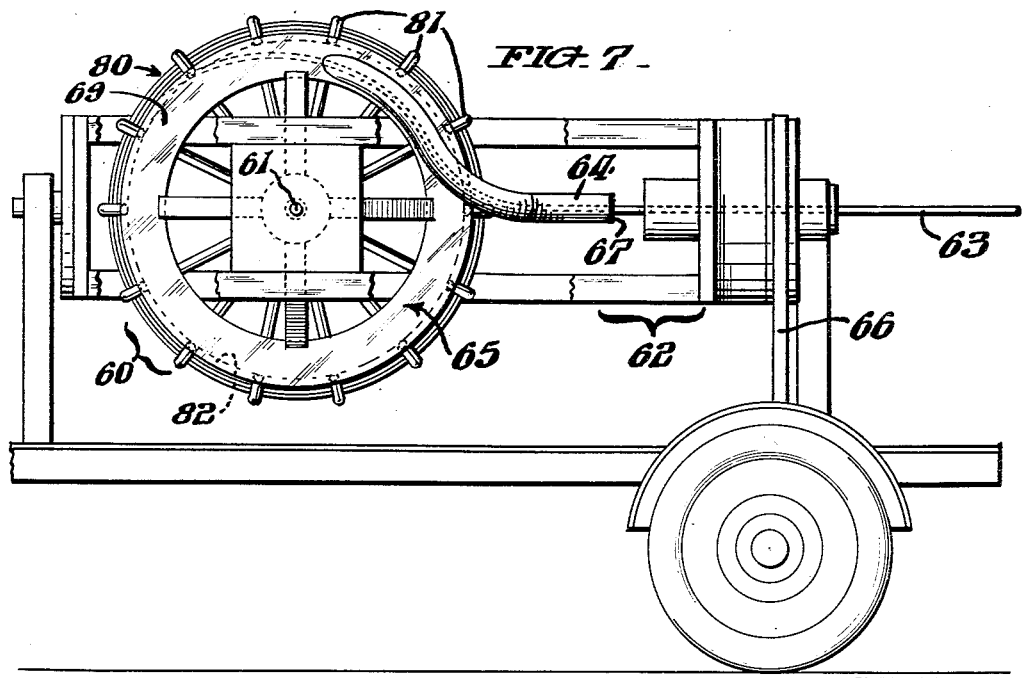
INVENTOR.
Charles B. Caperton,
BY Paul & Paul
ATTORNEYS.

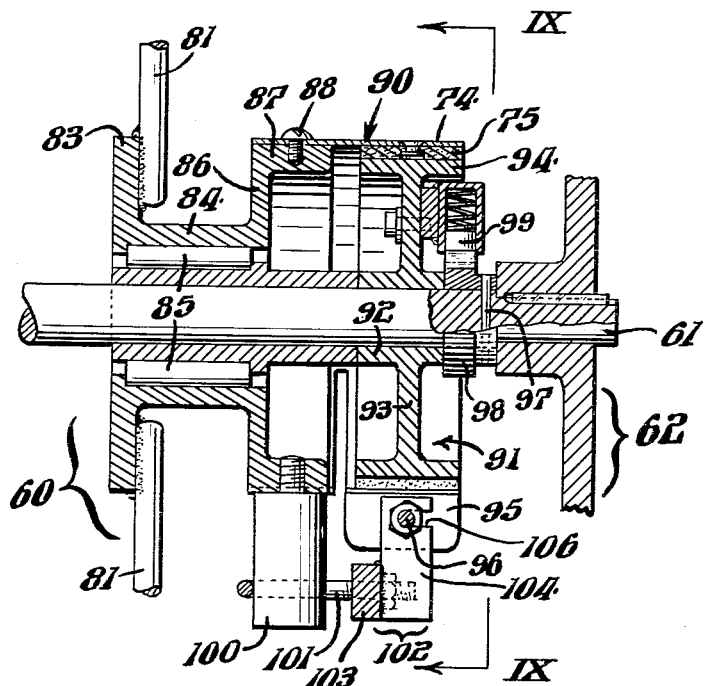
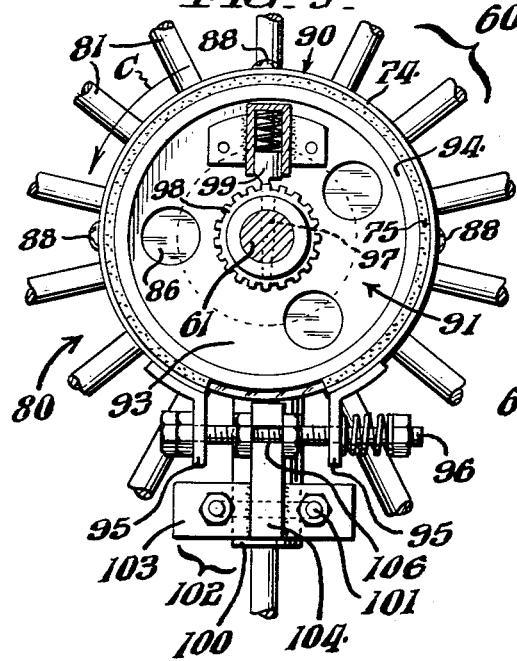
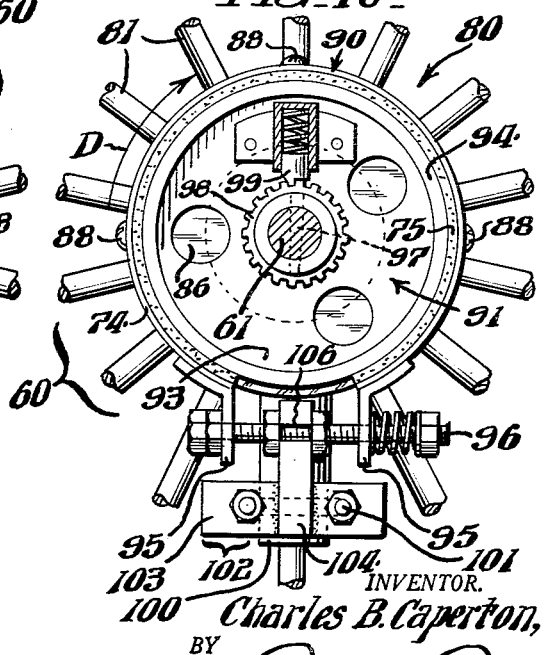

June 19, 1962    C. B. CAPERTON    3,039,715
ROD REEL DEVICE
Filed April 25, 1960    5 Sheets-Sheet 5
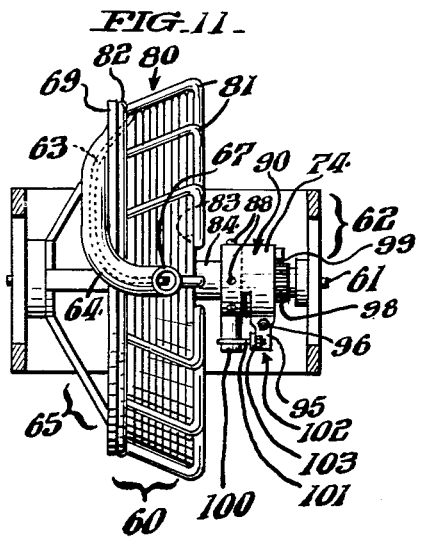
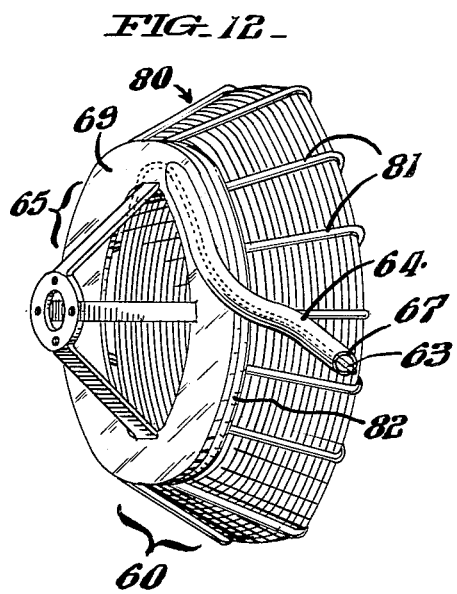
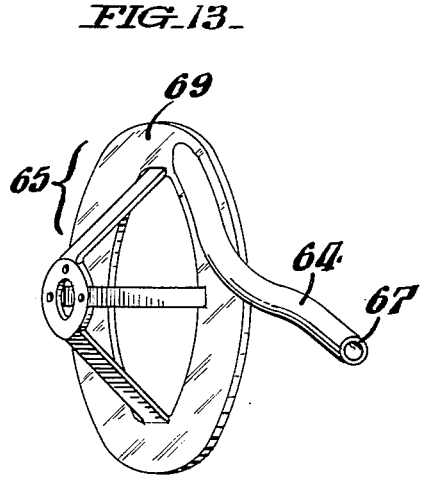
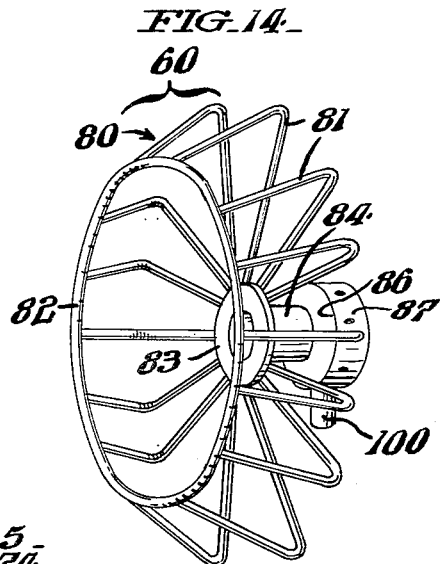
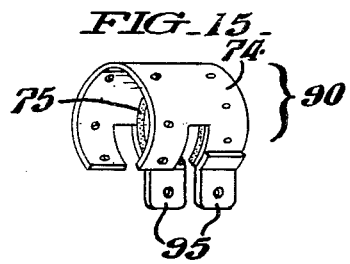
INVENTOR.
Charles B. Caperton,
BY Paul & Paul
ATTORNEYS.

United States Patent Office 3,039,715
Patented June 19, 1962

3,039,715
ROD REEL DEVICE
Charles B. Caperton, 1832 Pine St.,
Philadelphia 3, Pa.
Filed Apr. 25, 1960, Ser. No. 24,621
12 Claims. (Cl. 242—82)

This patent application is a continuation-in-part of my patent application entitled "Rodding Reel Device," Serial Number 8,683, filed February 15, 1960, now abandoned.

The present continuation-in-part application is being filed in order to add several additional figures of drawing and a more specific description of, as well as to add claims specifically directed to, my device as applied to an alternate form of reel in which the rods are fed to and taken from the reel along a line substantially in the same plane as the coils of the reel. Such an alternate form of reel, and the manner in which the device of my invention may be applied thereto, was briefly described on pages 12 and 13 of the above-identified original application but was not illustrated nor claimed specifically.

My invention relates to rodding equipment of the type used in the cleaning and maintenance of sewers, water pipes, and other underground conduit structures.

My invention relates particularly to apparatus for receiving and storing steel rods and for feeding out such stored steel rods.

As is well known, sewer pipes, water pipes and the like are cleared of obstructions, such as tree roots, sand, dirt, etc., by feeding rods into the pipe. At the foremost extremity of the rods a suitable tool is connected for performing particular cutting or clearing operations. Such tool may be an auger bit, a root saw, a centrifugal cutter, a pick-up, or any other of a large variety of tools especially adapted for the purpose. In order for the tool, particularly a cutting tool, to be effective, it is necessary ordinarily for the rods to be turned or rotated axially, and power drives have been developed and are available adapted to rotate the rods at a speed of the order of 90–120 r.p.m.

For long distance work, i.e. for distances of the order of 100 feet and more, it is customary to use a string of individual solid rods, of ¼" to ⅜" spring steel stock each about 39" long, coupled together with suitable couplings, thereby to form a continuous length of rods up to say 1000 feet in length.

For storing such lengths of coupled steel rods when not in use, or for transporting such rods to another work location, reels have been developed capable of holding 900–1000 feet of rods. Such reels are designed to confine the rods in coils or loops of large diameter in order to avoid bending the individual rods into a permanent "set." A typical reel will have a diameter of from 4 to 8 feet.

Because of the inherent properties of the spring steel rods to spring out to a straight line, it is not necessary for the reel to include an inner supporting surface. The tendency of the rods to straighten out keeps the rods in position on the reel, pressed against its outer peripheral surface.

I have observed, however, a tendency for the string of rods, during placement on to the reel, to take up loose over-lapping positions. This causes the rod couplings to catch on the loose overlapping rods and is, of course, highly undesirable.

My present invention provides means for attachment to a rod reel for assuring that the rods, during placement on to the reel, take up a tight coiled position, without looseness and entanglement.

My invention will be clear from a consideration of the following description of several preferred embodiments taken together with the drawing in which:

FIG. 2 is an elevational view, in section, along the line II—II of FIG. 1;

FIG. 3 is an enlarged detailed view of the center portion of FIG. 2 showing the condition of the pawl and ratchet when the rod guide is rotating in a clockwise direction;

FIG. 4 is a view similar to FIG. 3 but showing the condition of the pawl and ratchet when the rod guide is rotating in a counter-clockwise direction;

FIG. 6 is a top view, partly in section, of an alternate form of reel embodying the device of my present invention;

FIG. 7 is a side elevation of the alternate form of reel shown in FIG. 6;

FIG. 8 is a detailed view, in section, of the resistance device of my invention as applied to the alternate form of reel and as viewed along the line VIII—VIII of FIG. 6;

FIG. 9 is a view, in section, along the line IX—IX of FIG. 8 showing the condition of the pawl and ratchet when the reel is rotating in a counter-clockwise direction during unreeling of the rods;

FIG. 10 is a view similar to FIG. 9 but showing the condition of the pawl and ratchet when the reel is rotating in a clockwise direction during reeling in of the rods;

FIG. 11 is a front elevational view of the alternate form of reel as viewed along the line XI—XI of FIG. 6 looking in the direction of the arrows and showing the brake mechanism;

FIG. 12 shows the guide tube and reel;

FIG. 13 shows the guide tube and spider mounting apart from the reel cage;

FIG. 14 shows the framework of the reel cage and the supporting collar for the brake band; and FIG. 15 shows the details of the brake band.

Figures 1, 5:
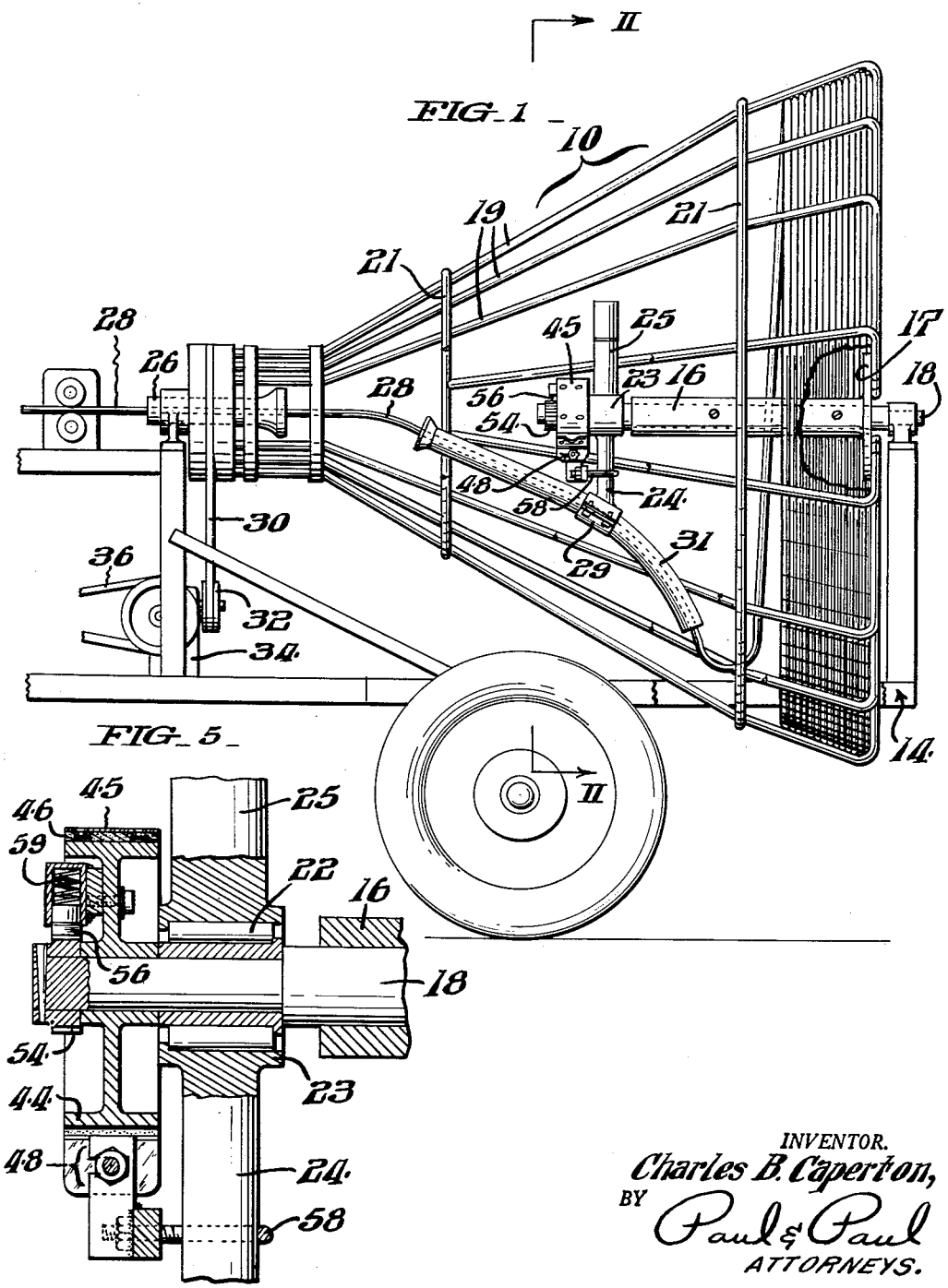
FIG. 1 is a side elevation, partly in section, of a typical rod reel embodying the improvement of my invention.
FIG. 5 is a cross section along the line V—V of FIG. 3.

In describing the preferred embodiments of my invention illustrated in the drawing, specific terminology has been resorted to for the sake of clarity. However, it is not my intention to be limited to the specific terms so selected, and it is to be understood that each specific term includes all technical equivalents which operate in a similar manner to accomplish a similar purpose.

Referring now to FIG. 1 there is shown a known form of rod reel 10 comprising a bell-shaped wire cage mounted on a two wheel vehicular frame 14 for rotation about the horizontal axis of the reel.

Reel 10 is shown adapted to be driven rotationally as by means of a belt drive 30, pulley 32, reduction gearing 34, drive belt 36, and a driving motor not shown. Such driving means are employed for rotating the rods axially, thereby to rotate the cutting tool secured to the forward end of the rods. Such reel driving means may also be used to overcome the inertia of a heavy rod-laden reel and to get it started rotating during unreeling, after which the driving means is decoupled.

So far as the improvement provided by my present invention is concerned, reel 10 need not by driven rotationally at all; it could just as well be merely freely rotatable, or even fixed.

In the particular embodiment selected for illustration in FIG. 1, reel 10 may be assumed to be rotatably supported. It is shown fixed at its large diameter end to a shaft 18 and fixed at its small diameter front end to a hollow shaft 26 through which the steel rods 28 pass. Both shafts 18 and 26 may be assumed to be rotatably mounted. If it were preferred that reel 10 be fixed, shafts 18 and 26 could merely be fixed in their supports. In either event, that is whether reel 10 is rotatable or fixed, the guide tube 31, later to be referred to, must be rotatable relative to the reel 10. In another form of reel, shown in FIGS. 6 and 7, later to be referred to, the guide tube is fixed, but the reel is necessarily rotatable.

Referring again to FIG. 1, while rods 28 will ordinarily be a string of individual steel rods coupled together, the rods 28 could just as well be a continuous length of stiff spring steel rod, insofar as my present invention is concerned. Hence, for convenience, no effort has been made to illustrate the couplings in the drawing.

In the form of reel shown in FIG. 1, a cage-supporting shaft 18 extends axially into the reel cage and has fixed thereto a cylindrical sleeve 16 having at its outer end a flange 17 to which the radial spokes of the cage are secured. At its inner end, sleeve 16 supports other radial spokes which have been omitted from the drawing to avoid confusion. These omitted spokes extend to an inner ring (not shown) which together with ribs (not shown) form, with the outer cage, a trough for receiving the rods.

At the innermost end of shaft 18 is mounted a mechanism the details of which are shown in FIGS. 3, 4, and 5 of the drawing. As seen in FIG. 1, such mechanism includes a member 23 mounted on shaft 18 in freely rotatable manner, as by roller bearings 22. Member 23 has oppositely extending arms 24 and 25. Arm 24 terminates in a clamp portion 29 which holds elongated guide tube 31 through which the rods 28 are passed. A flared end of guide tube 31 is located near to the center axis of the reel near the front end. Beyond clamp 29, the tube 31 curves outwardly so that its other end is located near to the ribs 19 of the cage near to the large diameter end of the reel. Tube 31 is so shaped that the rods passing therethrough are gradualy curved without being bent severely enough to result in a permanent set.

The device just described, comprising the guide arm 24, the curved guide tube 31 and the counterweight arm 25 are known parts of a conventional reel. Since guide arm 24 is free to rotate on shaft 18 independently of reel 10, the guide tube 31 moves rotationally in relation to reel 10 as required in response to the force of the rods passing therethrough as they are placed on or taken from their peripheral position in the trough of the reel.

The direction of rotatable movement of the freely rotatable guide tube 31 is either clockwise or counter-clockwise, depending upon whether the rods are being taken from or placed on the reel. Assume that, as illustrated in the drawing, when the rods 28 are pulled from the reel 10 the guide tube 31 will rotate clockwise relative to the reel, as viewed from the small end of the reel. Then, when the rods are placed on to the reel, (assuming the same direction of coil) the guide tube 31 will rotate counter-clockwise. The reel itself, if rotatable, always tends to move in the rotational direction opposite to that in which the guide tube 31 tends to move. Thus, in FIG. 1, in pulling rods 28 from the reel, reel 10 tends to move counter-clockwise.

It is particularly desirable that the guide tube 31 be freely rotatable in its normal direction of rotation when the string of rods is pulled from the reel, since any drag or resistance to free rotation of the guide tube 31 would cause the coils (i.e. the coiled rods) to be pulled toward the center of the reel. This would loosen the coils of rods from the wall of the peripheral trough and cause overlap and tangle before the rods passed through the tube. It is because of this demand for free rotation of the guide tube 31 that its supporting arm 24 and counterweight arm 25 are mounted on roller bearings 22, as shown in FIG. 5.

I have observed that, if the guide tube 31 is free to rotate when the string of rods 28 is being placed on (as distinguished from being pulled from) the reel, there is a tendency for the rods to coil loosely and thus to cause tangling of the rods and the couplings. I have discovered that this tendency to coil loosely is related to the freedom of rotation of the guide tube 31 on shaft 18. It seems that as the string of rods is pushed through the guide tube 31, the principal force tending to cause the rods to take up the desired coiled position in the trough of the reel is the force of the spirng steel rod in tending to maintain a straight position. With guide tube 31 freely rotatable in the opposite direction, the force does not appear to be sufficient to lay the rods in tight coils against the peripheral wall of the trough. This insufficiency of force is probably partially due to the fact that the diameter of the reel is necessarily large in order to avoid bending the rods to a permanent set.

My present invention provides means for preventing the string of rods, when being placed on the reel, from coiling loosely and tangling. With my improved device, the rods take up a tight coiled position against the peripheral wall of the reel.

I have found that in placing a string of rods on the reel if the resistance of guide tube 31 to free rotation in the opposite direction be sufficiently increased, the string of rods can be placed on to the reel in tight coils. Accordingly, I provide means adapted to permit free spooling of the guide tube 31 in one direction (i.e. in that direction in which tube 31 tends to rotate when removing the string of rods from the reel) but adapted to add considerable drag or resistance to free rotation of the guide tube 31 in the opposite direction (i.e. in the direction in which tube 31 tends to rotate when placing the string of rods on to the reel).

A preferred device for accomplishing the foregoing when a reel of the type shown in FIG. 1 is involved, is shown in FIGS. 1 and 2, and in enlarged detail in FIGS. 3, 4 and 5. The device comprises principally a brake drum 44, an external brake shoe 45 (having thereon a suitable brake lining 46) a tension adjustment 48 for brake shoe 45, a ratchet 54, a pawl 56, and a U-clamp 58 for coupling brake shoe 45 to guide arm 24. Brake drum 44 is rotatably mounted on the reel shaft 18. The external brake shoe 45, being coupled to guide arm 24 by U-clamp 58, moves rotationally whenever guide tube 31 moves rotationally, and in a like direction and for a like distance. Ratchet 54 is fixed to reel shaft 18. Pawl 56 is mounted on the radial portion of brake drum 44 and is spring pressed against ratchet 54 by spring 59. The tooth of pawl 56 is shaped to permit clockwise rotation of the drum 44 relative to the ratchet 54 (FIG. 3) but to prevent counter-clockwise rotation of the drum relative to the ratchet (FIG. 4).

In operation, when the guide tube 31, as a result of forces exerted against it when the rods are pulled from the reel, moves rotationally in a clockwise direction relative to reel 10 and shaft 18 (clockwise as viewed from the small-diameter end of the reel 10), the brake shoe 45, being connected to guide arm 24 by U-clamp 58, moves rotationally clockwise relative to shaft 18. It will be seen from FIG. 3 that when brake shoe 45 rotates relatively clockwise, as indicated by the arrow A, the brake drum 44, to which pawl 56 is fixed, is free to move in the same clockwise direction in response to frictional engagement between the rotating brake shoe and the drum. This condition is clearly illustrated in FIG. 3 where it is seen that clockwise rotation of the pawl 56 relative to shaft 18 is permitted by reason of the fact that the sloping edge of the pawl tooth merely slides over the teeth of the ratchet 54.

When, however, the guide tube 31 tends to rotate in a counter-clockwise direction relative to reel 10 and shaft 18, as it does when the string of rods 28 is being pushed on to the reel, the brake drum 44 is not free to move in a counter-clockwise direction relative to shaft 18 due to the fact that the vertical edge of the pawl tooth engages a tooth of the ratchet 54. Thus, the brake drum 44 is locked against counter-clockwise rotation relative to shaft 18; and the brake shoe 45, which is in frictional engagement therewith, is prevented from rotating counter-clockwise relative to shaft 18 until such time as the force being exerted to move the brake shoe 45 rotationally counter-clockwise (in the direction indicated by the arrow B in FIG. 4) overcome the frictional force which is opposing such rotation. In the present case, the forces being exerted to move the brake shoe rotationally counter-clockwise relative to shaft 18 are those forces which are exerted against the guide tube 31 by the spring steel rods as they are pushed through the tube 31 to their peripheral position in the trough of the cage. The magnitude of the frictional force exerted by the brake which must be overcome by the force exerted by the rods is adjustable, as by the brake shoe adjusting rod 48.

I have just described my invention in relation to a known type of reel, shown in FIG. 1, in which the string of rods is taken from and fed to the reel along a line which is perpendicular to the plane of the coils of rod on the reel. However, my invention is also applicable to other forms of reel, for example, to reels of the type in which the rods are fed to and taken from the reel along a line substantially in the same plane as the coils of the reel. Such a reel is shown in FIGS. 6 and 7.

Referring now to FIGS. 6, 7, and 8, there is shown a reel 60 mounted for rotation about a fixed shaft 61 keyed into and supported by a frame 62. The rods 63 are taken from and placed on reel 60 by way of a guide tube 64 fixed to frame 62 by means of a spider 65. Guide tube 64 is positioned to receive and discharge the rods 63 in a direction which is substantially normal, i.e. radial, relative to the fixed shaft 61.

For driving the rods 63 axially rotationally, thereby to rotate a cutting tool which may be connected to the forward end of the coupled rods, the entire frame 62 may be mounted for rotation about its horizontal longitudinal axis and may be driven rotationally as by a belt drive 66. Guide tube 64 is so shaped and positioned that its mouth 67 is centered on the horizontal longitudinal axis about which the frame 62 is rotated.

Reel 60, as seen in FIG. 14, comprises a wire cage 80 composed of ribs 81 secured at one end to a circular hoop 82 and secured at the other end to a flange 83 of sleeve 84. As shown in FIG. 8, sleeve 84 is mounted, as by roller bearings 85, for rotation about the fixed shaft 61. The sleeve 84 has an outer L-shaped flange or collar 86 whose outwardly extending surface 87 has tapped holes therein for receiving screws 88 employed to secure to the surface 87 the C-shaped brake member 90 shown in FIG. 15.

As shown in FIG. 8, a member 91 is mounted for rotation on fixed shaft 61 just beyond the outwardly extending surface portion 87 of sleeve 84. Member 91, which serves as the brake drum, is shown as being H-shaped, with a shaft-engaging portion 92, a radial rib portion 93, and an outer flange portion 94.

As seen in FIGS. 8 and 15, the C-shaped brake member 90, which is secured by screws 88 to the outwardly extending surface 87 of flange 86, has a C-shaped portion 74 which extends beyond the surface 87 and which functions as the brake shoe. The under surface of brake shoe 74 is provided with a brake lining 75 adapted to frictionally engage the surface of the flange 94 of brake drum 91. The brake shoe 74 is provided with lugs 95, as seen in FIGS. 9 and 10 as well as in FIGS. 8 and 15, for receiving a spring-loaded tensioning bolt 96 employed to control the degree to which the brake frictionally engages the brake drum 91.

Mounted on shaft 61 and fixed thereto, as by pin 97, is a ratchet 98 which is adapted to be engaged by a spring-loaded pawl 99 secured to the radial rib 93 of brake drum 91.

For the purpose of assuring that the brake shoe 74 rotates, or tends to rotate, in a positive undistorted manner along with reel 60 when the reel is rotated, I provide means for connecting the collar 86 of sleeve 84 to the brake shoe 74 at a point located substantially at the center of the opening between the opposed ends of the C-shaped member 90. This is accomplished, in the particular embodiment shown in the drawing, by providing a stud 100 which is screwed into the outwardly extending portion 87 of collar 86 at its lowermost point, and by providing a U-bolt 101 to embrace the stud, the open ends of the U-bolt 101 being secured to the brake shoe 74. In the structure shown in the drawing, the open ends of the U-bolt 101 are secured to the brake shoe 74 by way of a T-member 102 comprising a crossbar 103 welded to an upright member 104. The open ends of the U-bolt 101 are bolted into the crossbar 103 and the upright member 104 has a slot 106 therein for embracing the spring-loaded tensioning bolt 96. In this manner, the lowermost part of the collar 86 of sleeve 84 of reel 60 is secured to the lugs 95 of the C-shaped brake shoe 74. Since the remaining portion of the brake member 90 is secured to the collar 86 by the screws 88, it is apparent that when reel 60 is rotated, a substantially equal rotational force will be imparted to the C-shaped brake shoe 74 around the entire circumference of the shaft, thus tending to cause the brake shoe to rotate in an undistorted manner.

In operation, when the rods 63 are pulled from the reel 60, the reel rotates in a clockwise direction as viewed in FIG. 7 but in a counter-clockwise direction as viewed in FIG. 6 from the top of the drawing, which is the view seen in detail in FIGS. 9 and 10. Brake shoe 74, being secured to sleeve 84 which in turn is secured to reel 60, rotates with the reel. Brake drum 91, being frictionally engaged by the brake shoe 74, tends to move rotationally with the brake shoe 74, and is permitted to do so by the fact that pawl 99 is free to move rotationally counter-clockwise, (as viewed in FIG. 9 and as indicated by the arrow C) without engaging the teeth of the ratchet 98 fixed to fixed shaft 61. Thus, the reel is free-spooling during unreeling of the rods 63.

When, however, the rods 63 are pushed on to the reel 60, the reel rotates, or tends to rotate, counter-clockwise as viewed in FIG. 7, but clockwise as viewed in FIG. 6 from the top of the drawing, and as seen in FIG. 10 and indicated by the arrow D. Rotational movement of the reel 60 in this direction is resisted by the fact that the brake drum 91 is not free to rotate, being locked against rotation in this direction (clockwise as viewed in FIG. 10) by the locking of pawl 99 in the ratchet 98, the latter being fixed to fixed shaft 61. Thus, rotation of reel 60 in this direction is accomplished only by overcoming the frictional resistance between the non-rotating brake drum 91 and the brake shoe 74.

It will be understood from FIGS. 12, 13 and 14, that when reel 60 moves rotationally about shaft 61, the guide tube 64 remains motionless, being fixed to spider 65 which is secured to frame 62. During rotation of the reel, the hoop 82 moves rotationally adjacent to the fixed annular portion 69 of spider 65.

It will be understood, while the guide tube 64 is shown in the drawing as adapted for receiving and discharging rods 63 along a line substantially perpendicular to the axis 61 of reel 60, that insofar as the resistance or drag device of my invention is concerned, the direction of feed of the rods relative to the plane of the coils of the reel may be any angle. Where the angle is small (for example, 0°–30°) the form of resistance device shown and described in connection with FIGS. 6–15 may be used; where the angle is large (for example, 60°–90°) the form of resistance device shown and described in connection with FIGS. 1–5 may be used.

While the preferred embodiments of this invention have been described in some detail, it will be obvious to one skilled in the art that various modifications may be made without departing from the invention as hereinafter claimed.

Having thus described my invention, I claim:

1. In combination; a reel for receiving and storing steel rods of the type used in the cleaning of sewer pipes; an elongated guide tube through which said rods are longitudinally passed; and means for resisting relative rotational movement between said guide tube and said reel in one direction while permitting free rotation in the other.

2. In combination; a reel for receiving and storing steel rods of the type used in the cleaning of sewer pipes; an elongated guide tube through which said rods are longitudinally passed; and means for resisting relative rotational movement between said reel and said guide tube in one direction while permitting free rotation in the other, said one direction being that direction in which said reel tends to move when rods are fed through said guide tube to said reel.

3. In combination; a reel for receiving and storing steel rods of the type used in the cleaning of sewer pipes; a shaft on which said reel is mounted; a guide tube through which said rods are passed, said guide tube being mounted on said shaft for rotation independently of said reel; and means for imposing resistance to the rotation of said guide tube in one direction relative to said reel while permitting free rotation in the other, said one direction being that direction in which said guide tube tends to move when rods are pushed through said guide tube on to said reel.

4. In combination; a reel for receiving and storing steel rods of the type used in the cleaning of sewer pipes; a shaft on which said reel is mounted; a guide tube through which said rods are passed, said guide tube being mounted on said shaft for rotation independently of said reel; and means coupled to said guide tube for resisting relative rotation between said guide tube and said reel in one direction while permitting free rotation in the other, said one direction being that direction in which said guide tube tends to move when rods are pushed therethrough on to the said reel.

5. In combination; a reel for receiving and storing steel rods of the type used in the cleaning of sewer pipes, said reel being mounted on a shaft; a guide tube, through which said rods are passed, mounted on said shaft for rotation independently of said reel; and means for exerting resistance to relative rotation between said guide tube and said reel in one direction while permitting free rotation in the other, said one direction being that in which said guide tube tends to move when said rods are pushed therethrough on to said reel, said last-named means comprising a brake drum and a brake shoe frictionally engaging said brake drum, said brake drum being mounted for rotation on said shaft, said brake shoe being coupled to said guide tube and rotatable therewith, thereby to tend to cause rotation of said drum, and means for resisting the rotation of said drum in one direction only relative to said shaft thereby to exert resistance against the rotation of said brake shoe and said guide tube in said one direction.

6. Apparatus as claimed in claim 5 characterized in that said means for resisting the rotation of said drum in one direction only comprises a spring-pressed pawl fixed to said drum and rotatable therewith, and a ratchet fixed to said shaft and adapted to be engaged and locked by said pawl when said pawl tends to move in said one direction.

7. Apparatus as claimed in claim 6 further characterized in that said shaft on which said reel is mounted has an axis which if extended would substantially coincide with the line along which said rods move when being pushed on to said reel.

8. In combination; a reel for receiving and storing steel rods of the type used in the cleaning of sewer pipes; elongated guide means through which said rods are longitudinally passed; a shaft on which said reel is mounted for rotation; and means for resisting relative rotational movement between said guide means and said reel in one direction while permitting free rotation in the other.

9. In combination; a reel for receiving and storing steel rods of the type used in the cleaning of sewer pipes; a shaft on which said reel is mounted for rotation; an elongated guide tube through which said rods are longitudinally passed; and means for resisting rotational movement between said reel and said guide tube in one direction while permitting free rotation in the other, said one direction being that direction in which said reel tends to move when rods are fed through said guide tube to said reel.

10. In combustion; a reel for receiving and storing steel rods of the type used in the cleaning of sewer pipes; a fixed shaft on which said reel is mounted for rotation; a guide tube through which said rods are passed, said guide tube being fixed relative to said shaft and arranged to receive and discharge said rods in a direction generally normal to said shaft; means for imposing resistance to the rotation of said reel in one direction about said shaft while permitting free rotation in the other, said one direction being that direction in which said reel tends to rotate when rods are pushed through said guide tube on to said reel.

11. In combination; a reel for receiving and storing steel rods of the type used in the cleaning of sewer pipes, said reel being rotatably mounted on a fixed shaft; a guide tube through which said rods are passed, said guide tube being fixed relative to said shaft and arranged to receive and discharge said rods in a radial direction relative to said shaft; and means for exerting resistance to rotation of said reel about said shaft in one direction while permitting free rotation in the other, said one direction being that in which said reel tends to rotate when said rods are pushed therethrough on to said reel, said last-named means comprising a brake drum and a brake shoe frictionally engaging said brake drum, said brake drum being mounted for rotation on said shaft, said brake shoe being coupled to said reel and rotatable therewith, thereby to tend to cause rotation of said drum, and means for resisting the rotation of said drum in one direction only about said shaft thereby to exert resistance against the rotation of said brake shoe and said reel in said one direction.

12. Apparatus as claimed in claim 11 characterized in that said means for resisting the rotation of said drum in one direction only comprises a spring-pressed pawl fixed to said drum and rotatable therewith, and a ratchet fixed to said shaft and adapted to be engaged and locked by said pawl when said pawl tends to move in said one direction.

References Cited in the file of this patent

UNITED STATES PATENTS

| | | |
|---|---|---|
| 2,872,130 | Nardone | Feb. 3, 1959 |
| 2,886,258 | Haugwitz | May 12, 1959 |